US009222830B2

(12) United States Patent
Borodin et al.

(10) Patent No.: US 9,222,830 B2
(45) Date of Patent: Dec. 29, 2015

(54) OPTICAL CONTROL SENSOR SYSTEM WITH DRIVER THAT SWITCHES FREQUENCIES OF A SET OF DIFFERENT ORTHOGONAL SIGNALS AND MODULATES THE INTENSITY OF LIGHT

(75) Inventors: Anatoliv Borodin, Setauket, NY (US); William Cheng, Plainview, NY (US); Dmitri Gavrilov, Setauket, NY (US); Mikhail Gouzman, Centereach, NY (US); Vladislav Kuzminskiy, Coram, NY (US); Vladimir Smagin, Centereach, NY (US)

(73) Assignee: RESEARCH FOUNDATION OF THE STATE UNIVERSITY OF NEW YORK, Stony Brook, NY (US)

( * ) Notice: Subject to any disclaimer, the term of this patent is extended or adjusted under 35 U.S.C. 154(b) by 414 days.

(21) Appl. No.: 13/704,904

(22) PCT Filed: Jun. 17, 2011

(86) PCT No.: PCT/US2011/040882
§ 371 (c)(1),
(2), (4) Date: Mar. 6, 2013

(87) PCT Pub. No.: WO2011/160019
PCT Pub. Date: Dec. 22, 2011

(65) Prior Publication Data
US 2013/0161483 A1 Jun. 27, 2013

Related U.S. Application Data

(60) Provisional application No. 61/355,716, filed on Jun. 17, 2010.

(51) Int. Cl.
*G01J 1/42* (2006.01)
*G01D 5/26* (2006.01)
*H04J 14/02* (2006.01)
*H05B 37/02* (2006.01)

(52) U.S. Cl.
CPC .............. *G01J 1/4257* (2013.01); *G01D 5/268* (2013.01); *H04J 14/02* (2013.01); *H05B 37/02* (2013.01)

(58) Field of Classification Search
CPC . G01J 1/4257; G01J 2021/1765; G01J 21/27; G01J 21/62; G01J 21/63; G01D 5/268; G02B 26/002; G02B 26/02; G02B 26/04; G01B 26/007; H04J 14/02; H05B 37/02
USPC .................. 250/216, 227.14, 227.21, 227.28; 398/141, 162, 163, 168, 172; 340/555–557
See application file for complete search history.

(56) References Cited

U.S. PATENT DOCUMENTS

4,353,031 A * 10/1982 Bock ........................ H03K 5/15
327/164
5,696,863 A * 12/1997 Kleinerman .................. 385/123
(Continued)

*Primary Examiner* — Georgia Y Epps
*Assistant Examiner* — Carolynn A Moore
(74) *Attorney, Agent, or Firm* — F. Chau & Associates, LLC (57) ABSTRACT

A optical control sensor system includes a driver controlling an operation of a light source coupled to an end of an optical fiber, an orthogonal signal generator, generating a set of different orthogonal signals controlling the driver, a terminal sensor coupled to another end of the optical fiber selecting a predetermined set of input orthogonal signals for converting them into component combinations, constituting output signals, and directing the output signals back to the optical fiber, a device coupled to the light sources and to the first end of the optical fiber for extracting output signals that have passed through a return path in the optical fiber, a detector converting optical output signals into electrical signals, and a selector and a decoder connected to the orthogonal signal generator indicating a current state of the optical control sensor system based on an analysis of the selected combinations of components in the output signals.

6 Claims, 6 Drawing Sheets

(56) References Cited

U.S. PATENT DOCUMENTS

| | | | |
|---|---|---|---|
| 5,784,157 A * | 7/1998 | Gorfinkel | G01N 21/6408 204/452 |
| 6,839,491 B2 * | 1/2005 | Painter et al. | 385/50 |
| 7,085,492 B2 * | 8/2006 | Ibsen et al. | 398/38 |
| 2009/0292168 A1 * | 11/2009 | Farr | 600/109 |
| 2010/0046944 A1 * | 2/2010 | Wagener et al. | 398/34 |
| 2011/0018465 A1 * | 1/2011 | Ashdown | H05B 33/0818 315/294 |

* cited by examiner

FIG. 6
TABLE 1

| Combinations of Amplitudes of Detected Components | f1, f2, f3 | Diagnosis |
|---|---|---|
| s11, s12, s13 | | State 1, ok |
| 0, s12, s13 | | State 1, *Laser 1a or *Channel 14a |
| s11, 0, s13 | | State 1, *Laser 1b or *Channel 14b |
| s11, s12, 0 | | State 1, *Laser 1c or *Channel 14c |
| 0, 0, s13 | | *Laser 1a or *Channel 14a, *Laser 1b or *Channel 14b |
| 0, s12, 0 | | *Laser 1a or *Channel 14a, *Laser 1c or *Channel 14c |
| s11, 0, 0 | | *Laser 1b or *Channel 14b, *Laser 1c or *Channel 14c |
| s21, s22, s23 | | State 2, Ok |
| 0, s22, s23 | | State 2, *Laser 1a or *Channel 14a |
| s21, 0, s23 | | State 2, *Laser 1b or *Channel 14b |
| s21, s22, 0 | | State 2, *Laser 1c or *Channel 14c |
| 0, 0, s23 | | *Laser 1a or *Channel 14a, *Laser 1b or *Channel 14b |
| 0, s22, 0 | | *Laser 1a or *Channel 14a, *Laser 1c or *Channel 14c |
| s21, 0, 0 | | *Laser 1b or *Channel 14b, *Laser 1c or *Channel 14c |
| s31, s32, s33 | | State 3, Ok |
| 0, s32, s33 | | State 3, *Laser 1a or *Channel 14a |
| s31, 0, s33 | | State 3, *Laser 1c or *Channel 14c |
| s31, s32, 0 | | State 3, *Laser 1c or *Channel 14c |
| 0, 0, s33 | | *Laser 1a or *Channel 14a, *Laser 1b of *Channel 14b |
| 0, s32, 0 | | *Laser 1a or *Channel 14a, *Laser 1c of *Channel 14c |
| s31, 0, 0 | | *Laser 1b or *Channel 14b, *Laser 1c of *Channel 14c |
| 2%, 2%, 2% | | *Fiber |
| 0, 0, 0 | | *Laser 1a or *Channel 14a, *Laser 1b or *Channel 14b, *Laser 1c or *Channel 14c |

OPTICAL CONTROL SENSOR SYSTEM WITH DRIVER THAT SWITCHES FREQUENCIES OF A SET OF DIFFERENT ORTHOGONAL SIGNALS AND MODULATES THE INTENSITY OF LIGHT

CROSS-REFERENCE TO RELATED APPLICATION

This application is a National Stage which claims the benefit of International Application No. PCT/US2011/40882, filed on Jun. 17, 2011, which claims the benefit of U.S. Provisional Application No. 61/355,716, filed on Jun. 17, 2010, the disclosures of which are herein incorporated by reference in their entirety.

BACKGROUND OF THE INVENTION

1. Technical Field

The present invention relates to the field of automatic control engineering and more particularly to the control of optical signals switched among multiple network nodes.

2. Discussion of Related Art

A large number of electronic system components produce electromagnetic interference, which may affect the operational performance of systems, lead to increased weight of electrical wiring, etc. Fiber optic networks are increasingly being used to replace or supplement electrical systems. In these fiber optic networks, optical control sensors are used not only to monitor performance of various systems but also to switch signals among network nodes.

SUMMARY OF THE INVENTION

According to an embodiment of the present disclosure, an optical control sensor system includes a light source for emitting light, an orthogonal signal generator, generating a set of different orthogonal signals, and a driver for switching frequencies of the set of different orthogonal signals and modulating an intensity of the light.

According to an embodiment of the present disclosure, a system includes an optical fiber, a plurality of light sources emitting light of different wavelengths to a first end of the optical fiber, a driver controlling an operation of the plurality of light sources, an orthogonal signal generator, generating a set of different orthogonal signals for controlling an operation of the driver, a terminal sensor coupled to a second end of the optical fiber, the terminal sensor selecting a predetermined set of input orthogonal signals for converting them into component combinations, constituting output signals, and directing the output signals to the second end of the optical fiber, a device coupled to the light sources and to the first end of the optical fiber for extracting the output signals that have passed through a return path in the optical fiber, a detector converting the output signals into a plurality of electrical signals, and a selector and a decoder indicating a current state of the system and providing continuous self-testing of the system based on an analysis of the output signals.

According to an embodiment of the present disclosure, a system includes an optical fiber, a light source emitting light of a wavelength λ1 to generate an input optical signal to a first end of the optical fiber, a driver controlling an operation of the light source, an orthogonal signal generator, generating a signal at frequency f1 for controlling an operation of the driver, a terminal sensor coupled to a second end of the optical fiber, the terminal sensor converting the input optical signal from the light source into a plurality of output signals which are fluorescence responses of photoluminescent materials of the terminal sensor, and directing the output signals to a second end of the optical fiber, a device coupled to the light source and to the first end of the optical fiber for extracting the output signals that have passed through a return path in the optical fiber, a detector converting the output signals into a plurality of electrical signals, and a selector and a decoder comparing phase shifts of the output signals to a position of the input signal and indicating a current state of the system and providing continuous self-testing of the system based on an analysis of the output signals.

BRIEF DESCRIPTION OF THE DRAWINGS

Exemplary embodiments of the present disclosure, as well as definitions and meanings of abbreviations, will be described below in more detail, with reference to the accompanying drawings.

DETAILED DESCRIPTION OF EXEMPLARY EMBODIMENTS

An optical control sensor system, utilizing an optical fiber for input and output signals, and capable of self-testing is described herein.

According to an embodiment of the present disclosure, an optical control sensor system includes a generator of orthogonal signals, light sources emitting light of different wavelengths, a single optical fiber transmitting input and output signals, and a terminal sensor converting input signals into output. The optical control sensor system further comprises a device for coupling input signals from the light sources onto one end of the optical fiber and for extracting output signals that have passed from the terminal sensor through a return path in the optical fiber, a device for detecting output signals, and a decoder, indicating the current state of the control sensor system and providing self-testing diagnostics of the system.

Figure 1:
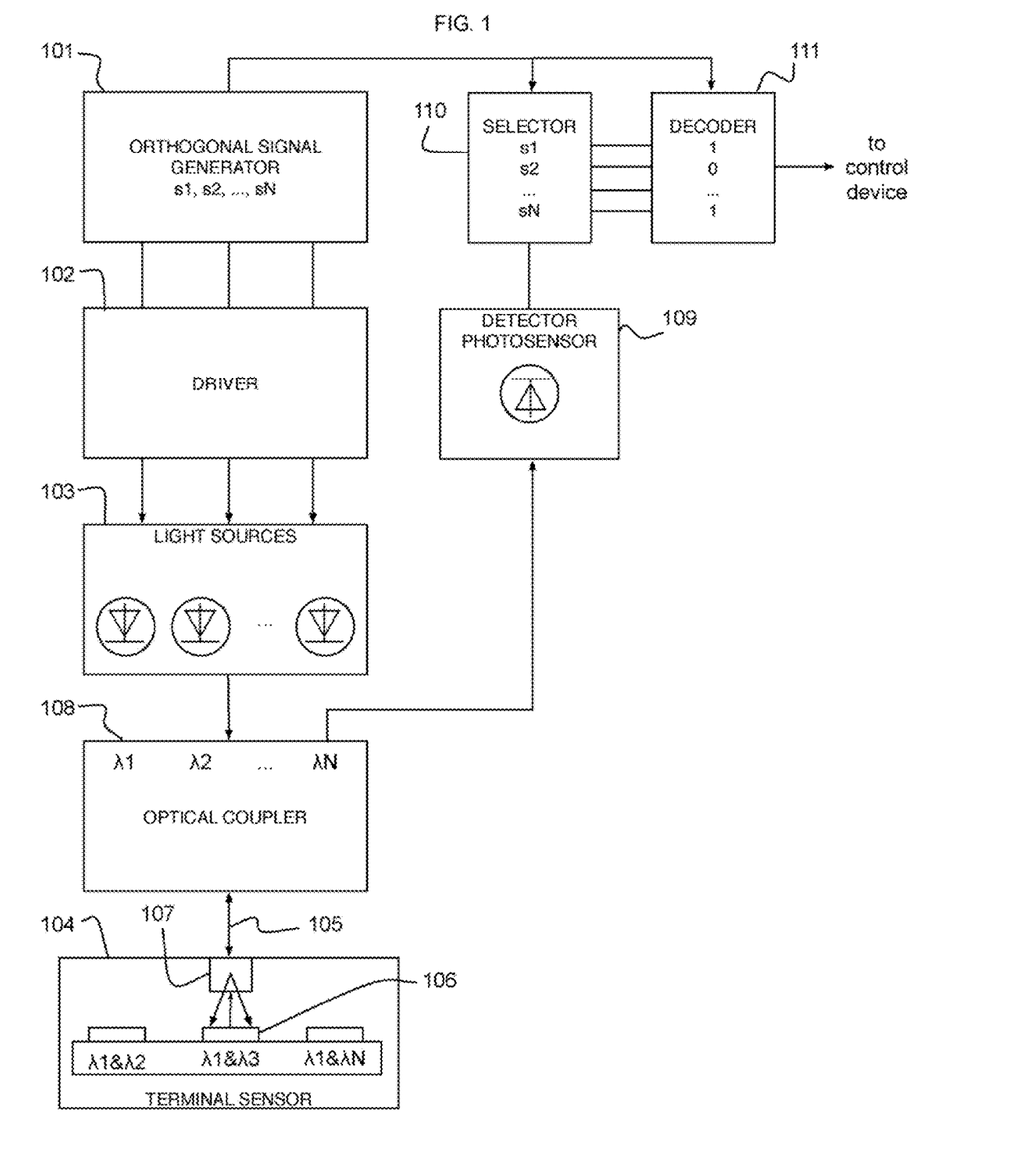
FIG. 1 is a block diagram showing an exemplary optical control sensor system according to an embodiment of the present disclosure.

Referring to FIG. 1, an exemplary optical control sensor system includes an orthogonal signal generator 101 generating a set of orthogonal signals s1, s2, . . . , sN, a driver 102 connected to the orthogonal signal generator 101, wherein the driver 102 is controlled by the orthogonal signal generator 101, and light sources 103 emitting light of different wavelengths λ1, λ2, . . . , λN, controlled by the driver 102 to generate input signals. The optical control sensor system further includes a terminal sensor 104 connected to one end of an optical fiber 105 and operated by an operator or by an operating unit, to convert input light signals from the light source 103 into output signals by selecting a predetermined set of combinations of components.

The terminal sensor 104 comprises a coupler 107 which may be used for connecting a terminal sensor 104 to a fiber 105, a converter 106 for converting input signals directed to convertor 106 by coupler 107 into output signals, as well as for directing the output signals back to the coupler 107, and then to the optical fiber 105.

The optical control sensor system further includes an optical coupler 108 for coupling input signals from the light sources 103 to another end of the optical fiber 105, and for extracting output signals that have passed through a return path in the optical fiber 105 from the terminal sensor 104, a detector 109 including a photo sensor for converting the extracted output signals from the optical coupler 108 into electrical signals, and an electronic selector 110 for separating output signals into a predetermined set of components, constituting the output signals. The electronic selector 110 is connected to the detector 109 supplying output signals, and to the orthogonal signal generator 101 synchronizing an operation of the electronic selector 110. The optical control sensor system includes a decoder 111 indicating a current state of the optical control sensor system and providing self-testing diagnosis of the system channels by analyzing the combinations of components in output signals. The self-testing diagnosis may be continuously performed. The decoder 111 is connected to the electronic selector 110 supplying components for analysis and to the orthogonal signal generator 101 synchronizing an operation of the decoder 111.

The number of system states is equal to the number of acceptable combinations of components in the output signals, which is not limited by the number of light sources and can be increased by using additional input signals, generated by the orthogonal signal generator and controlled by the driver, as well as by using the converter (including in the terminal sensor) sensitive to input signals.

Using the electronic selector 110, the optical control sensor system provides high signal-to-noise (S/N) ratio and decreases the number of optical connections that may be susceptible to failure. The orthogonal signal generator 101 connected to the decoder 111 and the selector 110, synchronizes their operation and enables continuous self-testing diagnosis of the system channels. An exemplary diagnosis procedure is presented in TABLE 1 found in FIG. 6.

Figures 2A, 2B:
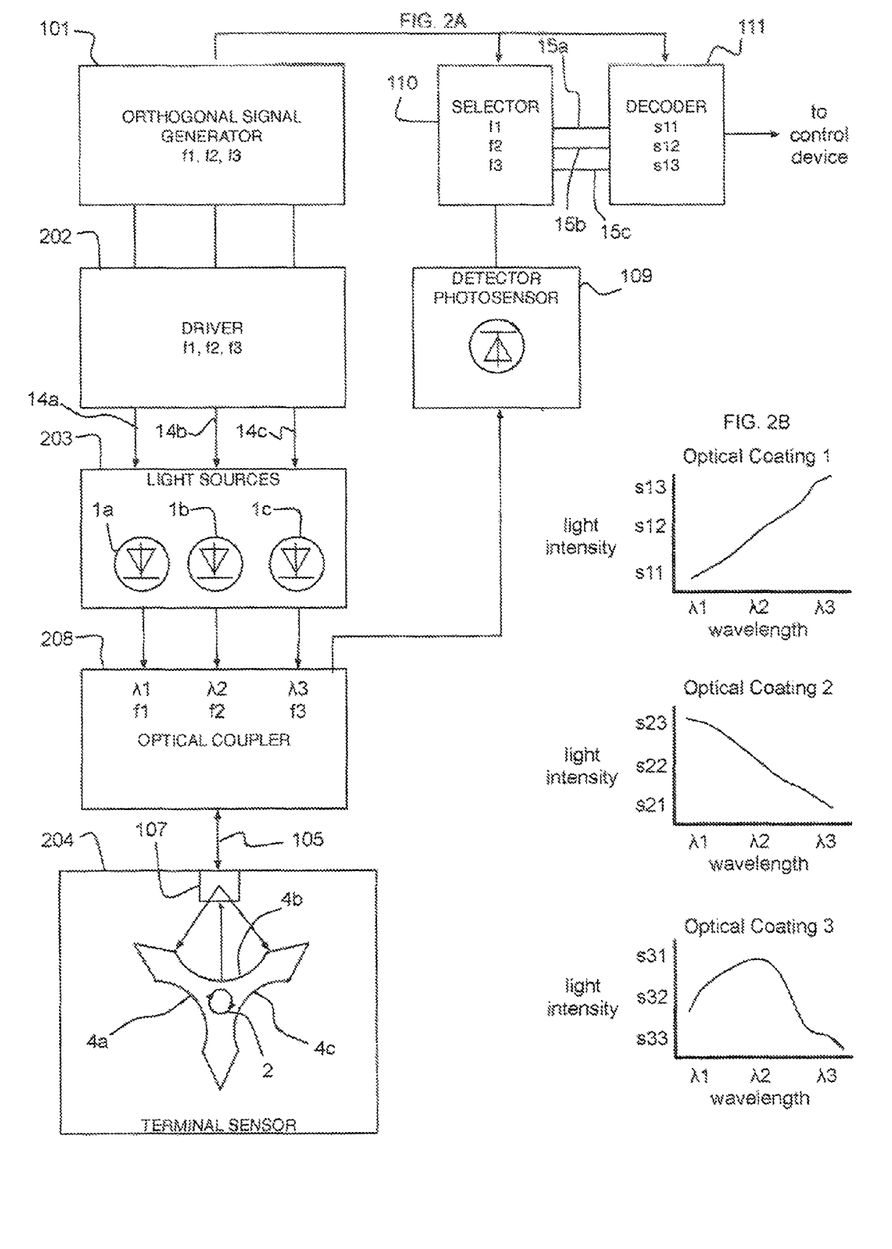
FIG. 2A is a block diagram showing an exemplary optical control sensor system according to an embodiment of the present disclosure.
FIG. 2B illustrates a section of reflectance curves of different optical coatings covering concave reflectors of a terminal sensor of the optical control sensor system of FIG. 2A according to an embodiment of the present disclosure.

An exemplary optical control sensor system and terminal sensor are shown in FIG. 2A capable of performing continuous self-testing according to an embodiment of the present disclosure. A driver 202 includes means used to modulate the intensity of light of different wavelengths, λ1, λ2, . . . , λN, emitted by light sources 203 (e.g., lasers 1a, 1b and 1c) at different frequencies f1, f2, and f3. The light sources 203 are coupled through optical channels 14a, 14b, and 14c to an optical coupler 208, which transmits light to the terminal sensor 204 through an optical fiber 105. The terminal sensor 204 includes three concave reflectors 4a, 4b and 4c covered by different optical coatings, and a coupler 107 used to couple the terminal sensor 204 to the optical fiber 105 and to direct light to one of the reflectors 4a, 4h and 4c. Light, converted by one of the reflectors 4a, 4b and 4c facing the coupler 107, carries output signals back to the coupler 107 and to the optical fiber 105. Reflectors 4a, 4b and 4c may be installed on a spindle 2 or other switching means, and can be switched by an operator or an operating unit from one reflector to another in order to change the control sensor system state.

Referring to FIG. 2B, there are shown sections of reflectance curves of three different optical coatings of concave reflectors 4a, 4b and 4c. The size and locations of the section [λ1, λ3] may be selected with consideration of the shape of reflectance curves in order to obtain different values of reflectance for wavelengths of λ1, λ2 and λ3. FIG. 2B illustrates an exemplary method by which the control sensor system converts input signals into output signals, depending on the state of the system. Light beams of wavelengths λ1, λ2 and λ3 with intensity modulated at frequencies f1, f2, and f3, emitted by lasers 1a, 1b and 1c are input signals, which are converted by a terminal sensor into output signals.

In case a reflector 4a with coating 1 is facing a coupler (e.g., in optical communication with the coupler), with the amplitudes of intensity of modulated light having the same value, the amplitudes of intensity of components of output signals equal S11, s12 and s13. In case the optical fiber is broken, input signals cannot reach the terminal sensor and are reflected back from a broken end. The amplitude of intensity of the light reflected from the broken end of the fiber is approximately 2% of the amplitude of light intensity of the beams 14a, 14b and 14c. In case a reflector 4b is facing a coupler, the amplitudes of intensity of components of output signals equal s21, s22 and s23, And in case a reflector 4c is facing a coupler, the amplitudes of intensity of components of output signals equal s31, s32 and s33.

If the optical fiber is broken, the amplitudes of intensity of components of output signals equal about 2%, 2% and 2%. Output signals with the amplitudes of intensity of components equaling s11, s21 and s31 are modulated at frequency f1; output signals with amplitudes of intensity of components equaling s12, s22 and s32 are modulated at frequency f2; and output signals with amplitudes of intensity of components equaling s13, s23 and s33 are modulated at frequency. The output signals that have passed through a return path in the optical fiber are extracted by an optical coupler using filters tuned to select signals modulated at different frequencies, f1, f2 and f3, and are directed to a decoder through channels 15a, 15b and 15c. The signals received by the decoder may differ, depending on the coating of the reflector facing the coupler, enabling diagnosis of the state of the control sensor system.

Figure 6:
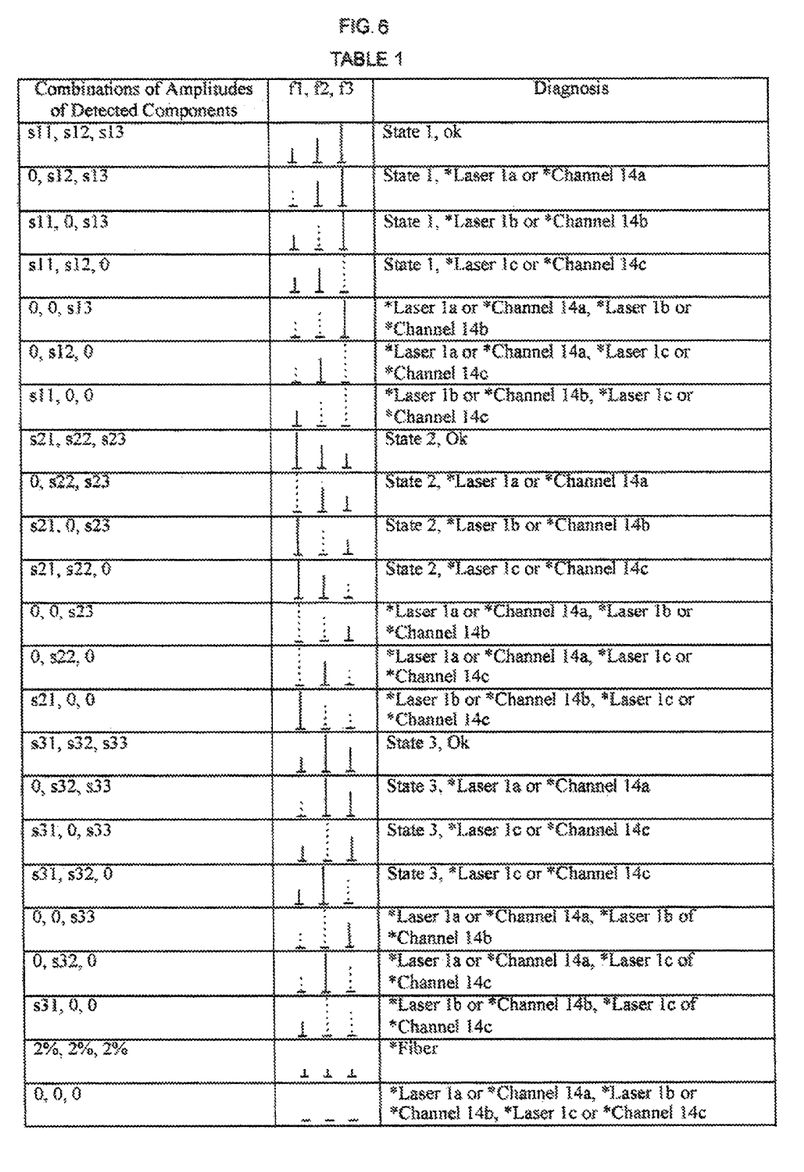
FIG. 6 shows an exemplary diagnosis table (TABLE 1) according to an embodiment of the present disclosure.

TABLE 1 in FIG. 6 shows an exemplary diagnosis procedure of the optical control sensor system in an arbitrary state according to an embodiment of the present disclosure. If an element in TABLE 1 is marked with an asterisk (*), the element failed. Vertical bars in the middle column of TABLE 1 illustrate amplitudes of components constituting output signals. A Solid bar denotes that the component is detected by the detector and a dashed bar indicates that the component is not detected.

While a failure in laser 1a may also mean a failure in channel 14a or channel 15a, an occurrence of a laser failure can be excluded by checking a signal from a built-in monitor photodiode. Further, failures in channels 15a, 15b and 15c, connected to an electronic selector and decoder, may be excluded by checking a signal from the built-in electronic means. The described system allows an operator to obtain an unambiguous diagnosis of channels 14a, 14b and 14c.

The construction of a control sensor system according to an embodiment of the present disclosure allows for the detection of occurrences of failure in channels 15a, 15b and 15c without a built-in electronic means. This can be achieved by supplying a driver with a means of switching frequencies and modulating the intensity of light of lasers 1a, 1b and 1c.

Figure 3A:
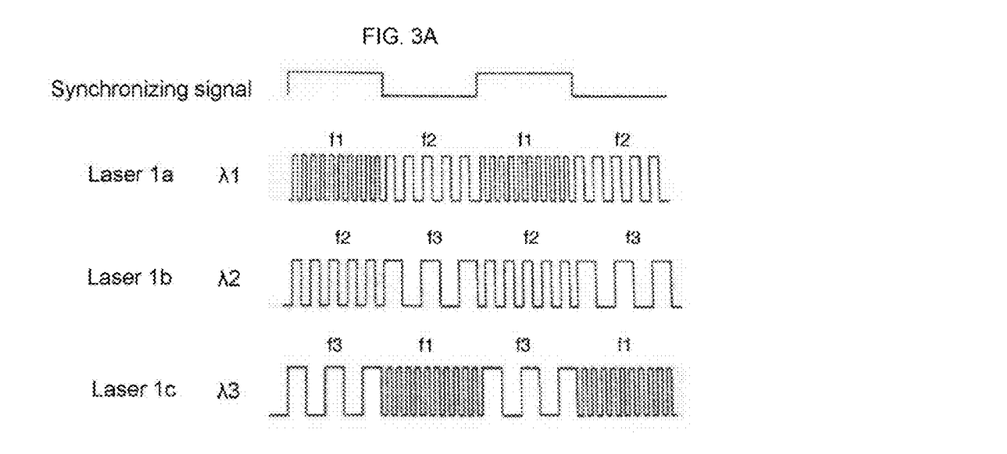
FIG. 3A is a timing diagram of input signals emitted by light sources and a synchronization signal generated by an exemplary orthogonal signal generator according to an embodiment of the present disclosure.

Referring to FIG. 3A there is shown an exemplary timing diagram of input signals emitted by lasers 1a, 1b and 1c and a signal generated by the orthogonal signal generator for synchronizing the operation of the driver and selector. Frequency f1, used for modulating the intensity of light emitted by laser 1a, is switched to frequency f2, which was used for modulating the intensity of light emitted by laser 1b. Frequency f2, used for modulating the intensity of light emitted by laser 1b, is switched to frequency f3, which was used for modulating the intensity of light emitted by laser 1c. And frequency f3, used for modulating the intensity of light emitted by laser 1c, is switched to frequency f1, which was used for modulating the intensity of light emitted by laser 1a.

Figure 3B:
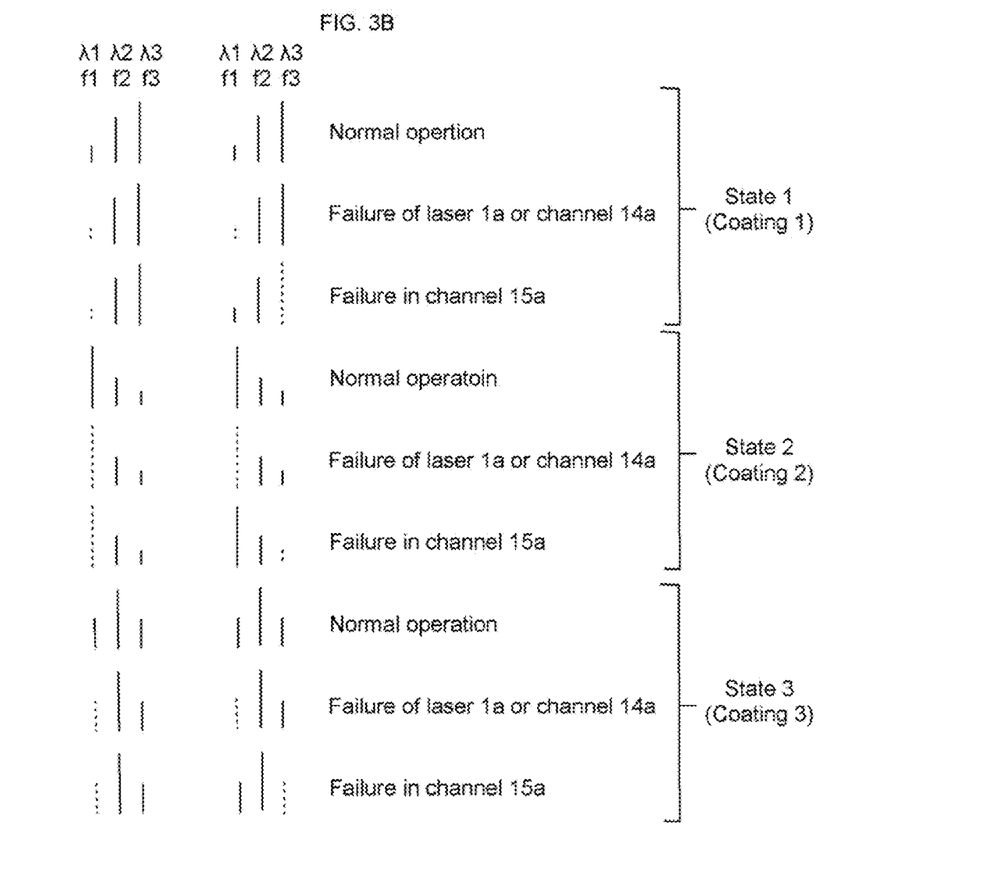
FIG. 3B illustrates a fragment of a table comprising diagrams of possible combinations of amplitudes of detected components constituting output signals from the terminal sensor of FIG. 2A according to an embodiment of the present disclosure.

Referring to FIG. 3B, there is shown a fragment of table comprising diagrams of possible combinations of amplitudes of detected components, which constitute output signals from a terminal sensor presented in FIG. 2A. Vertical bars in FIG. 3B are used to illustrate amplitudes of components constituting output signals. A solid bar indicates that the component is detected by the detector, while a dashed bar indicates that the component is not detected. FIG. 3B illustrates the capability of the system to diagnose a failure in channels 15a, 15b and 15c, while the diagnosis of a failure in channels 14a, 14b and 14c or lasers 1a, 1b and 1c can be made using built-in monitor photodiodes.

Figure 4A:
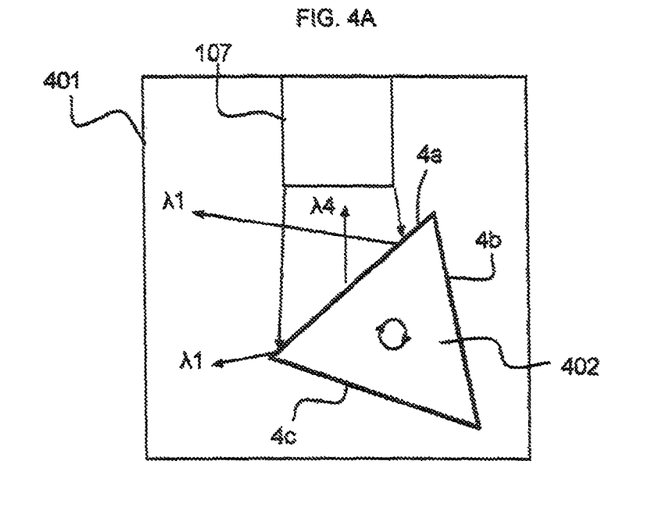
FIG. 4A shows a schematic construction diagram of an exemplary terminal sensor according to an embodiment of the present disclosure.

FIG. 4A is an exemplary schematic construction diagram of a terminal sensor 401 according to an embodiment of the present disclosure. The terminal sensor 401 comprises a prism 402 whose side planes 4a, 4b and 4c are covered with different coatings, coating 1, coating 2 and coating 3, respectively, which may contain photoluminescent materials for converting input optical signals into output signals. One of the prism side panels is facing a coupler 107 used for connecting the terminal sensor 401 to an optical fiber, directing input signals from an optical fiber to a prism plane, and for directing output signals back to the fiber. To reflect light from lasers and prevent the reflection of input signals back to the optical fiber, an angle between an axis of the coupler 107 and the surface normal, e.g., 4a, of the prism planes facing the coupler 107 is set to be approximately 45 degrees. The prism side plane facing a coupler can be switched by an operator or an operating unit in order to change the control sensor system state.

According to an embodiment of the present disclosure, a driver includes a means to control sequential switching of the light sources. Sequential switching of the light sources may increase an operating life of the light sources and decrease a risk of photo bleaching and photo damage of the photoluminescent materials. According to an embodiment of the present disclosure, a driver may include a means to modulate the intensity of light, emitted from the light sources (e.g., lasers), of different wavelengths $\lambda 1$, $\lambda 2$ and $\lambda 3$ at different frequencies f1, f2 and f3.

Figure 4B:
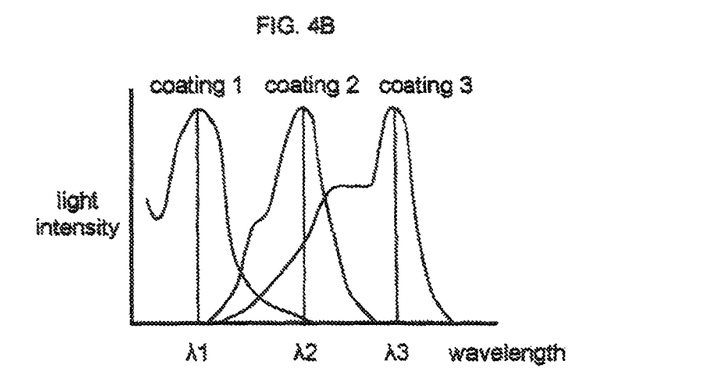
FIGS. 4B and 4C illustrate emission and excitation spectra of different coatings containing different photo luminescent materials in the terminal sensor of FIG. 4A according to an embodiment of the present disclosure.

Referring to FIG. 4B, there is shown exemplary emission and excitation spectra of three different coatings, coating 1, coating 2 and coating 3, containing different photoluminescent materials. FIG. 4B illustrates that operational laser wavelengths $\lambda 1$, $\lambda 2$ and $\lambda 3$ may be selected to approximate the maxima of emission spectra of photoluminescent materials used in coatings. The maxima of excitation spectra of photoluminescent materials may be shifted to the left as to the position of the maxima of emission spectra. Therefore, in a case where the prism side plane 4a with coating 1 is facing a coupler, an input signal of wavelength $\lambda 1$ modulated at frequency f1 is converted into spectrum of output signals (with maximum at $\lambda 4 < \lambda 1$), also modulated at frequency f1; in a case where the prism side 4b with coating 2 is facing a coupler, an input signal of wavelength $\lambda 2$ modulated at frequency f2 is converted into a spectrum of output signals (with maximum at $\lambda 5 < \lambda 2$), also modulated at frequency f2; and in a case where the prism side plane 4c with coating 3 is facing a coupler, an input signal of wavelength $\lambda 3$ modulated at frequency f3. Notwithstanding the fact that the amplitudes of intensity of input signals are of about the same value, the amplitudes of output signals can be different.

Figure 4C:
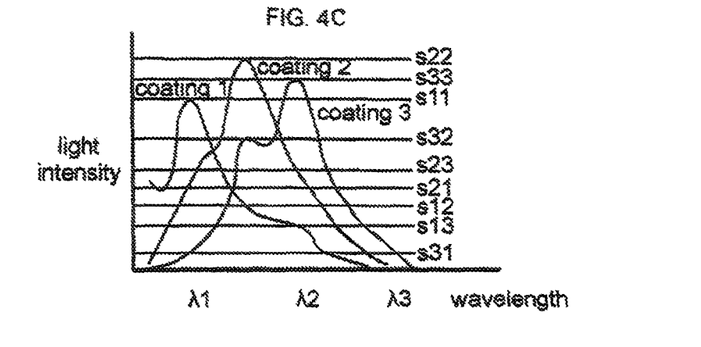

FIG. 4C illustrates the way the control sensor system converts input signals into output signals, depending on the state of the system. In case the prism side plane 4a is facing a coupler, a detector will detect a sequence of output signals with the amplitudes [s11, s12 and s13]; in case the prism side plane 4b is facing a coupler, a sequence of output signals will have the amplitudes [s21, s22, s23]; and in case the prism side plane 4c is facing a coupler, a sequence of output signals will have the amplitudes [s31, s32, s33]. Signals with amplitudes s11, s21 and s31 are modulated at frequency f1; signals with amplitudes s12, s22 and s23 are modulated at frequency f2; and signals with amplitudes s13, s23 and s33 are modulated at frequency 13. Since the signals are modulated at different frequencies, they can be separated by a selector in order to be used for diagnosing the state of the control sensor system by a decoder.

Figure 5:
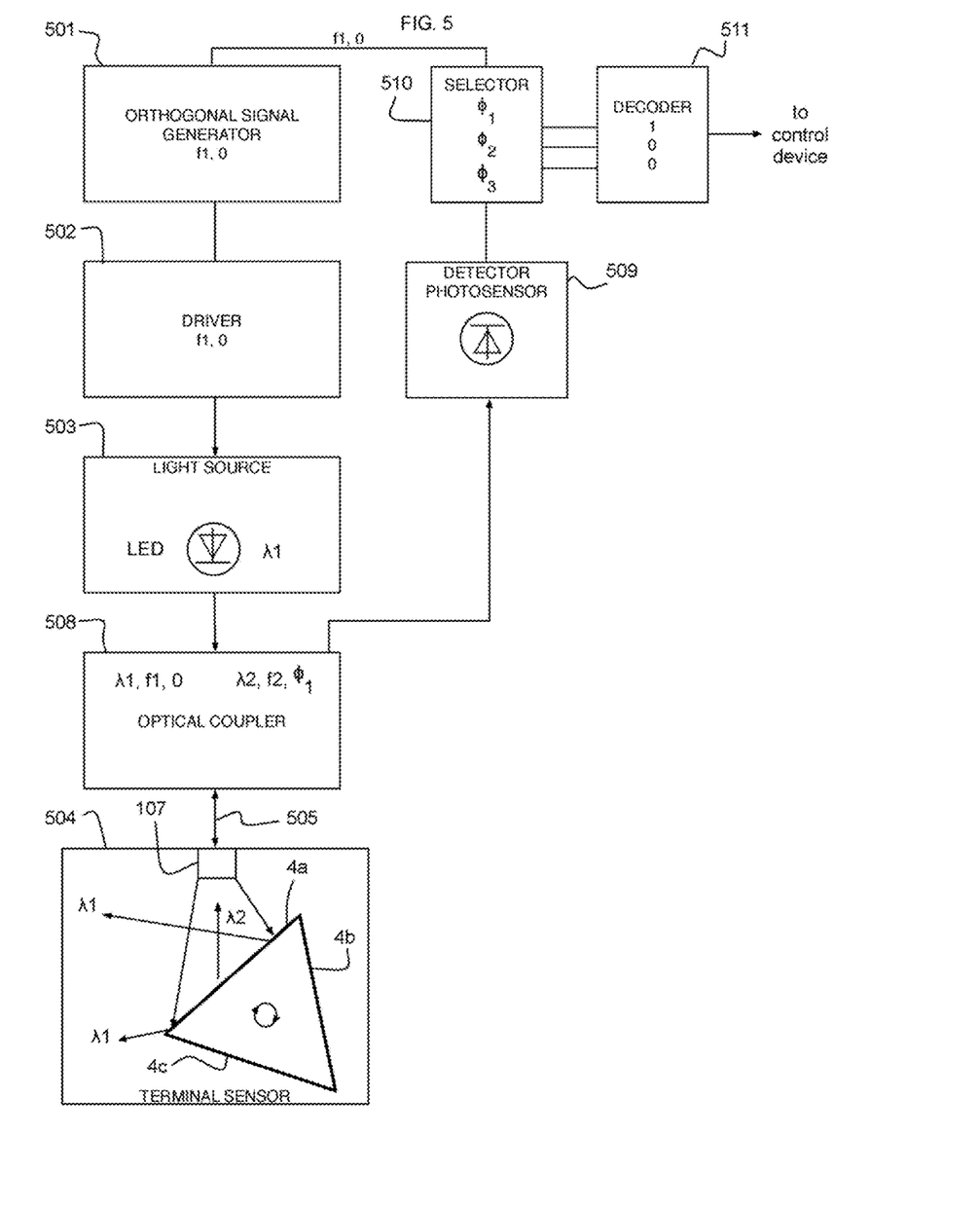
FIG. 5 is a block diagram showing a construction of an exemplary optical control sensor system according to an embodiment of the present disclosure.

Referring to FIG. 5, there is shown a schematic construction diagram of an exemplary optical control sensor system and terminal sensor according to an embodiment of the present disclosure. The optical control sensor system includes an orthogonal signal generator 501 generating a signal at frequency f1, a driver 502 connected to the orthogonal signal generator 501, wherein the driver 502 is controlled by the orthogonal signal generator 501, and a light source 503 controlled by the driver 502 and emitting light of a wavelength 21 to generate an input optical signal. The optical control sensor system further includes a terminal sensor 504 connected to one end of an optical fiber 505 and operated by an operator or by an operating unit, to convert an input light signal from the light source 503 into output signals which are fluorescence responses of photoluminescent materials selected from a predetermined set of materials. The terminal sensor 504 is substantially similar to the terminal sensor 104 described in connection with FIG. 1. The optical control sensor system further includes an optical coupler 508 for coupling the input signal form the light source 503 to another end of the optical fiber 505, and for extracting output signals that have passed through a return path in the optical fiber 505 from the terminal sensor 504, a detector 509 including a photo sensor for converting the extracted output signals from the optical coupler 508 into electrical signals, and an electronic selector 510 comprising means to compare phase shifts of output signals, as to the position of the input signal. The electronic selector 510 is connected to the detector 509 supplying output signals, and to the orthogonal signal generator 101 supplying an input signal. The optical control sensor system 100 includes a decoder 511 indicating a current state of the optical control sensor system and providing continuous self-testing diagnosis of the system channels by analyzing the combinations of components in output signals. The decoder 511 may be connected to the electronic selector 510, which supplies values of phase shift.

The intensity of fluorescence responses from the photoluminescent material is of the same frequency as input optical signals, while the phase shift of the responses may lag behind that of input optical signals by $\phi_i$, where i=1, 2 or 3 is a number of the selected photoluminescent material. If photoluminescent materials have different fluorescence decay times $\tau_i$, the phase shift of their fluorescence response $\phi_i$ may be different:

$$\phi i = a \tan(2\pi f \tau_i)$$

A current state of the optical control sensor system may depend on the material selected by an operator while using a terminal sensor and a corresponding phase shift selected by a selector. A decoder indicates that current state of the optical control sensor system or reports a system failure, in case no phase shift is selected.

According to an exemplary embodiment of the present disclosure, certain advantages, e.g., high reliability, may be obtained by implementing an optical control sensor system with only one light source and one channel.

Connecting an orthogonal generator to a selector and a decoder provides a means to synchronize the operation of all these devices, which allows for an increase in the number of system states by increasing the number of signals generated by the generator, without increasing the number of light sources.

According to an exemplary embodiment of the present disclosure, an orthogonal generator is included in the system and connected to a driver, a selector, and a decoder to synchronize the operation of these devices; an electronic device replaces an optical selector.

In view of the foregoing, the automatic control of optical control sensor system may be variously applied, for example, to aircraft and automobile applications, which utilize a large number of sensors to monitor performance of various systems, in which optical signals are switched among multiple network nodes.

It is to be understood that devices and processes described herein may be implemented in various forms of hardware, software, firmware, special purpose processors, or a combination thereof. Exemplary embodiments of the present disclosure may be implemented in software as an application program tangibly embodied on a computer readable program storage device or medium. The application program may be uploaded to, and executed by, a machine comprising any suitable architecture.

According to an embodiment of the present invention, a computer system for tiered indexing can comprise, inter alia, a central processing unit (CPU), a memory and an I/O interface. The computer system is generally coupled through the I/O interface to a display and various input devices such as a mouse and keyboard. The support circuits can include circuits such as cache, power supplies, clock circuits, and a communications bus. The memory can include random access memory (RAM), read only memory (ROM), disk drive, tape drive, etc., or a combination thereof. Embodiments of the present disclosure can be implemented as a routine that is stored in memory and executed by the CPU to process the signal from the signal source. As such, the computer system is a general purpose computer system that becomes a specific purpose computer system when executing the routine of the present invention.

The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. An optical control sensor system comprising:
   light sources for emitting light;
   an orthogonal signal generator, generating a set of different orthogonal signals;
   a driver for switching frequencies of the set of different orthogonal signals and modulating an intensity of the light emitted by the light sources;
   an optical fiber receiving the light of the light sources at a first end thereof;
   a terminal sensor coupled to a second end of the optical fiber, the terminal sensor selecting a predetermined set of input orthogonal signals for converting them into component combinations to constitute output signals, and directing the output signals to the second end of the optical fiber;
   a device coupled to the light sources and to the first end of the optical fiber for extracting the output signals that have passed through a return path in the optical fiber;
   a detector converting the output signals into a plurality of electrical signals; and
   a selector and a decoder connected to the orthogonal signal generator to indicate a current state of the optical control sensor system and to provide continuous self-testing of the system based upon an analysis of selected combinations of components in the output signals.

2. The system of claim 1, wherein the driver for switching frequencies of the set of different orthogonal signals and modulating an intensity of the light provides a sequential switching of the plurality of light sources.

3. The system of claim 1, wherein the terminal sensor includes concave reflectors for reflecting light of different wavelengths.

4. The system of claim 1, wherein the terminal sensor includes reflectors covered by different optical coatings that provide a continuous self-testing of the system based upon a dependence of the reflectivity factor on the wavelength of input signals.

5. The system of claim 1, wherein the terminal sensor comprises photoluminescent materials that provide continuous self-testing of the system based upon a dependence of emission light intensity of the wavelength of input signals.

6. The system of claim 5, wherein the photoluminescent materials are incorporated into coatings covering surfaces with normal vectors tilted approximately 45 degrees in relation to propagation of input optical signals of excitation wavelengths.

* * * * *